United States Patent
Kim (12)

(10) Patent No.: US 6,268,064 B1
(45) Date of Patent: Jul. 31, 2001

(54) POLYPROPYLENE COMPOUND FOR EXTRUDED BODY SIDE MOLDING

(75) Inventor: Sehyun Kim, Murrysville, PA (US)

(73) Assignee: Aristech Chemical Company, Pittsburgh, PA (US)

( * ) Notice: Subject to any disclaimer, the term of this patent is extended or adjusted under 35 U.S.C. 154(b) by 0 days.

(21) Appl. No.: 09/407,488

(22) Filed: Sep. 28, 1999

(51) Int. Cl.$^7$ .................................................. B32B 27/08
(52) U.S. Cl. .............................................. 428/516; 524/451
(58) Field of Search .................... 524/528; 428/35.7, 428/516

(56) References Cited

U.S. PATENT DOCUMENTS

| 5,290,886 | 3/1994 | Ellul | 524/515 |
|---|---|---|---|
| 5,397,832 | 3/1995 | Ellul | 524/515 |
| 5,466,520 | * 11/1995 | Krallmann | 428/323 |
| 5,744,535 | 4/1998 | Akagawa et al. | 524/451 |
| 5,763,520 | 6/1998 | Park et al. | 524/451 |
| 5,773,515 | 6/1998 | Srinivasan et al. | 525/240 |
| 5,800,912 | 9/1999 | Osigo et al. | 428/323 |
| 5,837,369 | * 11/1998 | Grunberger | 428/349 |

FOREIGN PATENT DOCUMENTS

| 0 869 143 A1 | 10/1998 | (EP) . |
|---|---|---|
| WO 98/44041 | 10/1998 | (EP) . |
| WO 98/27154 | 6/1998 | (WO) . |
| WO 98/31744 | 7/1998 | (WO) . |

OTHER PUBLICATIONS

Ellul, M. Plasticization of Polyolefin Elastomers, Semicrystalline Plastics and Blends Crosslinked In Situ During Melt Mixing Oct. 1996.

* cited by examiner

Primary Examiner—Paul R. Michl
(74) Attorney, Agent, or Firm—Robersts Abokhair & Mardula, LLC

(57) ABSTRACT

The present invention relates to polypropylene compositions for forming articles through extrusion. These parts are particularly useful in automotive body side moldings applications. In one embodiment, the invention is directed to an extruded resin material comprising (a) a skin layer of polypropylene polymer and (b) a core layer composition comprising a polypropylene polymer with an impact modifier and an inorganic filler. The core composition preferably comprises about 25–30 percent by weight of the impact modifiers. The impact modifier is preferably a copolymer of ethylene and a higher alpha olefin. The inorganic filler is present in an amount of about ten percent by weight.

12 Claims, No Drawings

POLYPROPYLENE COMPOUND FOR EXTRUDED BODY SIDE MOLDING

BACKGROUND

The present invention relates to polypropylene-based resin compositions for use in extrusion processes. These compositions find use in body side molding applications commonly employed in, for example, the automotive parts industry. These compositions can replace parts typically comprising other thermoplastic materials such as polyvinyl chloride. The body side moldings of the present invention are produced by co-extrusion. The co-extrudate comprises a core layer; and a skin layer that optionally contains metallic pigment. The core and skin materials comprise a thermoplastic olefin ("TPO") compound and polypropylene, respectively.

It has been typical in the automotive parts industry to manufacture exterior parts from various types of polymer materials. These polymer materials have significant advantages over more traditional materials such as metals. For instance, the polymer materials are lighter weight, and are often cheaper to produce. These materials may also have the advantage of being recyclable.

One of the first materials used in automotive exterior parts applications was polyvinyl chloride (PVC). Some of the advantages of PVC include dimensional stability, flexibility, receptiveness to paint and/or other coating materials, and compatibility with foam tapes which are typically used to attach the body side molding to the automobile. PVC has certain drawbacks. These include difficulties in processability, and environmental concerns associated with the material itself. As a result, many attempts have been made to replace PVC exterior automotive parts with parts made from other polymer materials. These polymers have included polypropylene.

Polypropylene resin materials have been designed for bumper covers, bumper fascia, spoilers, body side cladding or molding, and so forth. However, there are certain drawbacks to polypropylene resins which are not inherent to PVC. PVC is flexible and forms a good part when extruded and subsequently quenched from the melt.

Unlike PVC, polypropylene is brittle and distorted due to shrinkage when quenched from the melt. Polypropylene thus requires various other components to be incorporated to reduce brittleness and shrinkage. To reduce brittleness, especially at a low temperature, rubber or $C_2$–$C_8$ olefin copolymers are employed as impact modifiers. However, the presence of impact modifiers in polypropylene decreases the stiffness of the compound. Therefore, inorganic fillers such as talc are incorporated in order to achieve a balance between impact resistance and stiffness. Also, these fillers tend to reduce shrinkage of the final product. In order to minimize distortion, slow cooling, preferably via air, is often employed. However, slow air cooling requires relatively long cooling time before subsequent processing.

It is known in the art that polypropylene resin products can be formed via several distinct processes. These include molding processes. It is known in the art that body side exterior parts comprising polypropylene can be manufactured using various types of molding operations. Polypropylene resins utilized in making molded products are disclosed in the following references U.S. Pat. Nos. 5,744,535, 5,773,515, and 5,763,520. Additionally, EP 0869143, WO 9827154, and WO 9831744 disclose molded products made from polypropylene based resins.

More recently, U.S. Pat. No. 5,800,912 discloses a high gloss molded resin for use as an exterior body side molding for automobiles. The disclosed resins are disclosed as having high gloss, metallic luster, excellent weather-proofing and scratch resistant properties. The product materials are made via an injection molding process. The disclosed product is said to have two layers. The outer layer is referred to as the skin layer. The inner layer is referred to as the core layer. The physical and chemical properties of each layer are different. The skin layer provides a finished product having the desired external properties described above (i.e., high gloss, weather and scratch resistance). The core layer provides the flexibility and processability necessary to make a functional molded product. The polypropylene resins utilized have a minimum melt flow rate (MFR) of 30. This is desirable for the injection molding operations.

One commonality among the above references is the exclusive use of one or more injection molding process. However, injection molding processes are not always the most desirable processing method in the art. Other methods of processing polypropylene resins are known and desirable in the art. These include extrusion processes.

It is known in the art that polypropylene resins can be used to make finished products via extrusion processes. Extrusion processes have certain advantages over molding operations. In particular, extrusion manufacturing is generally less expensive than molding processes. Therefore, side molding parts made via extrusion will have a competitive advantage over similar molded parts.

It is also known in the art that an injection-molding grade polypropylene can not be used for extrusion process. In the context of producing exterior body side moldings, the processing window of the resin material is too narrow. The finished product will not have the desired physical properties mentioned above.

Therefore, it is an object of the present invention to provide a PVC replacement material suitable for manufacturing automotive exterior parts. Preferably, the exterior part is a body side molding.

It is another object of the present invention to provide polypropylene-based resin compositions suitable for use in making these automotive exterior parts.

It is a further object of the present invention to provide polypropylene-based resin compositions suitable for use in extrusion processes.

It is also an objective of the present invention to provide an automotive exterior part comprising two distinct layers.

SUMMARY OF THE INVENTION

In accordance with one embodiment of the present invention, an automotive exterior part comprising two distinct layers is provided. The outer or skin layer comprising a polypropylene material which exhibits a high gloss, stain and weather resistant finish. The skin layer optionally comprising coloring pigments and/or other additives such as UV or other stabilizers as are known in the art. The inner or core layer of the instant invention comprises a polypropylene resin composition. The resin material comprises an impact modifier and other filler material. The combination of skin and core layer provides a material having good processability when used in extrusion operations.

In accordance with an embodiment of the present invention, polypropylene-based resin materials are co- or bi-extruded into a material having a skin and core layer. The skin layer comprises a polypropylene resin. Examples of these include crystalline and non-crystalline polypropylene homo- and co-polymers. The skin layer may also include one or more inorganic coloring pigments. These pigments impart a desired appearance to the finished product.

The core layer of the instant invention includes a polypropylene component. This may also be homo- or co-polymer. The polypropylene component is preferably selected from products having a melt flow rate (MFR) equal to or less than 2.0 g/10 min at 230° C. The core layer also includes an impact modifier. Preferably, the impact modifier is an ethylene-α-olefin copolymer such as ethylene-propylene copolymers, ethylene-butene copolymers, and the like. The impact modifier is present in an amount of about 25–30 weight percent (wt. %). The core layer additionally comprises an inorganic filler. Talc is preferred. The inorganic filler is present in an amount of about 10 wt %. The combination of components in the core layer provides a composition having a die swell ratio of about 1.0-1.25.

As stated above, the instant compositions are processed in co- or bi-extrusion processes. The extruded products of the present invention are suitable for use in automotive exterior parts, preferably, as body side moldings.

DETAILED DESCRIPTION OF THE INVENTION

The present invention provides a process and composition for the manufacture of thermoplastic articles in an extrusion process. The extruded articles comprise two layers or components, a core layer and a skin layer. When these articles are manufactured into automotive body side moldings, the skin layer is the visible exterior layer. The core layer is the layer that imparts flexibility and adhesion to the automobile.

Desirable properties in the skin layer include high gloss, metallic luster, weather proofing, and scratch resistance. Suitable products for the skin layer include polypropylene homopolymers, random copolymers, block copolymers, and mixtures thereof. Higher crystallinity products are preferred. Examples of suitable skin layer compositions are disclosed in U.S. Pat. No. 5,800,912 to Ogiso et al. which is hereby incorporated by reference.

The core layer of the instant invention comprises a polypropylene component. Suitable products for the core layer include polypropylene homopolymers, random copolymers, block copolymers, and mixtures thereof. The core layer polypropylene products are selected from products having low melt flow rates (usually lower than 5 MFR). These are products that exhibit better behavior in extrusion processes. The polypropylene component preferably has a melt flow rate (MFR) equal to or less than 2.0 g/10 min at 230° C. Product having an MFR of about 1.0–1.2 g/10 min at 230° C. are preferred.

The core layer also includes an impact modifier. This is typically a $C_2$–$C_{20}$ co-polymer. Preferably, the impact modifier is an ethylene- -olefin copolymer. Examples include, but are not limited to, ethylene-propylene copolymers, ethylene-butene copolymers, and the like. The impact modifier is present in an amount of about 25–30 wt %.

The core layer also comprises inorganic filler. The inorganic filler is preferably selected from the group including glass fiber, talc, mica, calcium carbonate, wollastonite, clay, barium sulfate, whisker, calcium carbonate whisker, and silica. Talc is a preferred filler. The inorganic filler is present in an amount of about 10 to 15 percent by weight, with about 10% being preferred.

In the instant invention, the physical properties of the core layer are critical to the performance of the finished product. Applicants believe that the processability of the finished product is related to the die swell ratio of the core layer material. That is, the ratio of die swell (DS) at 190° C. and at 230° C. (as used herein, the "DSR"). The die swell measurements are performed in accordance with ASTM D-1238 with reference to Crown Zellerbach Test Method for Die Swell and Cone Die Melt Flow, October 1983. The DSR is determined using the following equation:

$$DSR = DS_{@230° C.}/DS_{@190° C.}$$

The DSR of the core layer should be in the range of about 1.0–1.25. If the DSR is outside the set range on the high end, the product will sag coming out of the die head before it is cooled. Sagging renders the finished product unacceptable. At DSR below about 1.0, the material may process acceptably, but will not meet the physical property requirements. Applicants have also discovered that the content of impact modifier is critical to the physical properties of the finished product. If the content is outside the range of about 25–30 weight percent (wt. %), the physical properties of the finished product become unacceptable. If the content is below about 25 wt. %, the final product does not have sufficient impact resistance for use in body side molding applications, and will exhibit stress whitening upon bending. If the content is above about 30 wt %, the product will be too flexible and too soft.

Additionally, the content of inorganic filler is critical to the physical properties of the finished product. The amount of filler is dependent on the properties of the starting polypropylene product. For the polypropylene products having a melt flow rate of 2.0 or less, the inorganic filler is present in an amount of about 10 to 15 wt %. If the level is below about 10 wt %, the final product will not be stiff enough. If the level is above about 15 wt %, the product will be too stiff. It is believed the two parameters, impact modifier and filler, work in concert to impart the desired physical properties in the finished product. It is preferred that the filler is present in an amount of about 10–11 weight percent.

The instant compositions are processed in a co-extrusion or bi-extrusion process. In a co-extrusion process, the skin layer is simultaneously coated on top of the core material as it is extruded. In a bi-extrusion process, the core is extruded first and subsequently, the skin layer is progressively coated around the core. These processes are known in the art. The extruded products of the present invention are suitable for use in automotive exterior parts, and preferably, for use as body side moldings.

The invention is illustrated by, but not limited to the examples that follow. In the extrusion process and to make the surface glossy, a tape, such as a PET tape, is attached on top of the skin layer. The extruded product is passed through a water trough of about 20 feet. The tape is peeled off at the end of the water trough right before being cut. The extruded side moldings are transferred to post processing lines where the parts are trimmed or shaped to the final configuration. Trimming and shaping is achieved with sharp knives at elevated temperatures. A foam tape, that bonds the molding to the vehicle, is attached to the back of the side molding. Sagging is judged by observing the extrudate from the die to the cutter, which is as the extrudate passes through the water bath or trough (about 20 feet).

The characteristics of the materials employed in this study are given in Table I.

TABLE I

Characteristics of materials employed in the study

|  | PP-A | PP-B | PP-C | IMF-1 | IMF-2 | IMF-3 |
|---|---|---|---|---|---|---|
| composition | $C_2$–$C_3$ | $C_2$–$C_3$ | $C_3$ | $C_2$–$C_8$ | $C_2$–$C_8$ | $C_2$–$C_4$ |
| SG[a] | — | — | — | 0.87 | 0.868 | 0.884 |
| MFR[b] | 1 | 2 | 1.5 | 10 | 1 | 2 |
| Mooney ML(1 + 4) 125° C. | — | — | — | 8 | 35 | 30 |
| Shore A | — | — | — | 75 | 75 | 77 |

[a]specific gravity
[b]melt flow rate @ 230° C.

Polypropylene-A is a impact of propylene with about 5–6 weight percent ethylene. Polypropylene-B is similar to Polypropylene-A except for the melt flow rate. Polypropylene-C is a polypropylene homopolymer. All three products were obtained from Aristech Chemical Corporation. Impact modifiers 1 and 2 (IMF-1 and IMF-2) are Engage® products (8200 and 8150) available from Dow-DuPont. Impact modifier 3 (IMF-3) is available from Union Carbide Corporation (DFDB 1085).

For these experiments, talc (10 μm) from Zemex was utilized. For the UV stabilizers, Tinuvin 770 and Chimassorb 944 from Ciba Specialty Chemical, were utilized. The various compounds were prepared utilizing a Werner-Pfleiderer ZSK-30 co-rotating twin screw extruder (L/D= 44). The polypropylene products were pre-blended prior to the extruder. The inorganic filler (talc) was added in the extruder. The method of addition was chosen because of the capabilities of the equipment. Other methods of addition that allow for proper mixing of the components may be utilized.

Comparative Example 1–3

Table II below gives the formulations and the properties of several comparative materials tested. As can be seen from Table II, the inorganic filler content was below the range of the instant invention. The amount of impact modifier was varied. All three comparative samples exhibited sagging after extrusion. Comparative example 2 also exhibited whitening. As can be seen from Table II, the materials were not acceptable for body side molding applications employing an extrusion process.

TABLE II

Comparative Examples

|  | CEX 1 | CEX 2 | CEX 3 |
|---|---|---|---|
| PP-A | 69 | 74 | 64 |
| IMF-1 | 23 | 18 | 28 |
| talc | 8 | 8 | 8 |
| SG | 0.93 | 0.93 | 0.94 |
| MFR (g/10 min) @ 230° C. | 1.6 | 1.6 | 1.9 |
| Tensile Strength (MPa) | 20.3 | 21.9 | 18.6 |
| Flexural Modulus (MPa) | 869 | 938 | 724 |
| Shore D | 50 | 52 | 48 |
| Instrumented Impact −30° C. (J) | 43.9 | 48.3 | 51.0 |
| Mold Shrinkage, % | 0.61 | 0.75 | 0.53 |
| Sagging | Yes | Yes | Yes |
| Whitening | no | Yes | No |

Comparative Example 4–6

Based on the results of Comparative Example 1–3, three compounds were formulated as given in Table III. In addition to tensile strength and flexural modulus, and MFR were targeted. The impact modifier (IWF) level was kept constant at 27 wt % while the type of polypropylene copolymer and the level of inorganic filler were varied.

TABLE III

Comparative Examples

|  | CEX-4 | CEX-5 | CEX-6 |
|---|---|---|---|
| PP-A | 65 | 0 | 65 |
| PP-B | 0 | 68 | 0 |
| IMF-1 | 27 | 27 | 27 |
| Talc | 8 | 5 | 5 |
| SG | 0.93 | 0.92 | 0.91 |
| MFR (g/10 min) @ 230° C. | 2.3 | 2.8 | 1.8 |
| Tensile Strength (MPa) | 18.2 | 19.0 | 18.6 |
| Flexural Modulus (MPa) | 752 | 786 | 717 |
| Shore D | 47 | 50 | 45 |
| Instrumented Impact −30° C. (J) | 52.2 | 51.1 | 51.1 |
| Mold Shrinkage, % | 0.52 | 0.55 | 0.75 |
| Sagging | Yes | Yes | Yes |
| Whitening | no | no | no |

As can be seen from Table III, the materials are still not acceptable. The inorganic filler content is below the accepted range of the instant invention. All compositions exhibited sagging. However, none exhibited whitening.

Comparative Examples 7–9

Based on the results of comparative examples 4–6, three compounds were formulated as given in Table IV. The filler level was increased to 15 weight %. To increase melt strength, impact modifiers having lower MFR were employed.

TABLE IV

Comparative Examples

|  | CEX 7 | CEX 8 | CEX 9 |
|---|---|---|---|
| PP-A | 65 | 65 | 65 |
| IMF-2 | 20 | 10 | 0 |
| IMF-3 | 0 | 10 | 20 |
| talc | 15 | 15 | 15 |
| SG | 0.975 | 0.96 | 0.98 |
| MFR (g/10 min) | 1.0 | 1.0 | 0.9 |
| Tensile Strength (MPa) | 21.0 | 20.1 | 20.8 |
| Flexural Modulus (MPa) | 1037 | 1108 | 1115 |
| Shore D | 57 | 56 | 55 |
| Instrumented Impact −30° C. (J) | — | 39 | 19 |
| Mold Shrinkage, % | 0.68 | — | 0.63 |
| Sagging | no | No | no |
| Whitening | Yes | Yes | yes |

As can be seen, the sagging problem was resolved. However, the compositions still failed due to whitening. It should be noted the impact modifier concentrations were constant at 20 weight percent.

Applicants concluded the impact modifier should be in the range of about 25–30 wt %. Since the stress concentration, that initiates crazes with an applied force, would be relieved via thermal energy at an elevated temperature, the initiation of crazing during the post-molding process was not expected. The combination of base polypropylene, impact modifier and filler affects the overall properties of the composition. All three factors interact together to provide a composition exhibiting acceptable physical and mechanical properties.

EXAMPLE 1–2

TABLE V

|  | EX-1 | EX-2 |
|---|---|---|
| PP-A | 65 | 65 |
| IMF-2 | 25 | 0 |
| IMF-3 | 0 | 25 |
| talc | 10 | 10 |
| SG | 0.935 | 0.945 |
| MFR (g/10 min) | 1.0 | 1.2 |
| Tensile Strength (MPa) | 18.8 | 20.6 |
| Flexural Modulus (MPa) | 853 | 958 |
| Shore D | 52 | 55 |
| Instrumented Impact −30° C. (J) | 52.3 | 39.1 |
| Mold Shrinkage, % | 0.62 | 0.74 |
| Sagging | no | no |
| Whitening | no | no |

The formulations shown above are acceptable. As can be seen, the material gave the required properties. For this application, the surface of the skin layer was also acceptable in being sufficiently smooth without blemishes.

TABLE VI

| DS | CEX-1 | CEX-2 | CEX-3 | CEX-4 | CEX-5 | CEX-6 | EX-1 | EX-2 |
|---|---|---|---|---|---|---|---|---|
| At 230° C. | 4.21 | 4.39 | 4.18 | 5.71 | 5.88 | 5.62 | 3.63 | 3.89 |
| At 190° C. | 3.31 | 3.37 | 3.43 | 4.16 | 4.91 | 4.35 | 3.2 | 3.27 |
| DSR | 1.27 | 1.30 | 1.22 | 1.37 | 1.20 | 1.29 | 1.13 | 1.19 |
| sagging | yes | yes | yes | yes | yes | yes | no | no |
| whitening | no | yes | no | no | no | no | no | no |

To better define the characteristics of the compositions of the instant invention, die swell of the compounds were determined at two different temperatures as given in Table VI. A die swell ratio (DSR) was also determined. Applicants determined that the materials having a DSR of about 1.0–1.2 do not sag during extrusion and do not stress-whiten upon folding. Thus these materials are acceptable for extrusion applications to make body side molding parts

EXAMPLE 3

For this example, Tinuvin 770 is utilized as the UV stabilizer 1 and Chimassorb 944 as the UV stabilizer 2. These UV stabilizers were added to both the skin and core layers as shown

TABLE VII

Core and Skin materials for Example 3

|  | core | skin |
|---|---|---|
| PP-A | 65 |  |
| IMF-3 | 25 |  |
| talc | 10 |  |
| PP-C |  | 100 |
| UV stabilizer -1 | 0.0125 | 0.0125 |
| UV stabilizer -2 | 0.0125 | 0.0125 |
| SG | 0.943 | 0.875 |
| MFR (g/10 min) | 1.1 | 1.5 |
| Tensile Strength (MPa) | — | 34.8 |
| Flexural Modulus (MPa) | 872 | 1572 |
| Shore D | 54 | 65 |
| Instrumented Impact −30° C. (J) | 42 | — |
| Mold Shrinkage, % | 0.74 | — |
| Die swell @ 190° C. | 3.2 | — |
| Die swell @ 230° C. | 4.0 | — |
| Ratio | 1.25 | — |
| Sagging | no | — |
| Whitening | no | — |

This formulation produced acceptable products without sagging or stress whitening. The melt flow rates were kept low for both the starting polypropylene materials and the compositions. Shrinkage is also within acceptable levels. Additionally, two color concentrates were applied to the skin layer. When the PET tape was peeled of at the end of the water trough (20 feet), the product exhibited acceptable surface smoothness and color. It was determined that in the extrusion process, an acceptable product must exhibit several properties to be commercially viable. The product must process well. This means that sagging during extrusion should not occur. Additionally, the skin layer tape should adhere sufficiently to go through the extrusion and cooling, whether air cooling or water bath. However, the tape should be easily removed prior to cutting and forming of the extrudate. This represents a requirement of unique balance between the tape and the polypropylene formulation of the skin layer. Stress whitening is also an issue during processing. All of these processing conditions are on top of the required physical properties of the final product.

Some general observations of the data lead to these conclusions. When the MFR or the composition is greater than 1.2, the extrudate of the material sags during extrusion. When die swell at 190° C. is less than 3.3, die swell at 230° C. is less than 4.0, and their ratio is less than 1.25, good profiles were produced without any difficulties. When the impact modifier is present in amounts greater than 20%, the parts were not stress-whitened.

While certain representative embodiments and details have been shown for the purpose of illustrating the subject invention, it will be apparent to those skilled in the art that various changes and modifications can be made therein without departing from the scope of the subject invention.

What is claimed is:

1. An extruded vehicle side molding material comprising:

(a) a skin layer comprising polypropylene polymer;

(b) a core layer composition comprising,
   (ii) polypropylene polymer,
   (ii) about 25–30 percent by weight of one or more impact modifiers, said impact modifier comprising a copolymer of ethylene and a higher alpha olefin, and
   (iii) about 10 wt % of inorganic fillers; and wherein the core layer has a die swell ratio of from about 1.0 to about 1.2.

2. A material according to claim 1 wherein the inorganic filler is talc.

3. A material according to claim 1 wherein the higher alpha olefin has three to eight carbon atoms.

4. A material according to claim 1 wherein the polypropylene of the skin layer is a homopolymer.

5. A material according to claim 1 wherein the polypropylene of the core layer is a homopolymer.

6. A material according to claim 1 wherein the polypropylene of the skin layer is an ethylene/propylene copolymer.

7. A material according to claim 1 wherein the polypropylene of the core layer is a propylene-ethylene copolymer.

8. A material according to claim 6 wherein the ethylene content of the copolymer is about 5–6 percent by weight.

9. A material according to claim 7 wherein the ethylene content of the copolymer is about 5–6 percent by weight.

10. A material according to claim 1 wherein the skin layer further comprises at least one inorganic colorant.

11. A material according to claim 1 wherein the skin layer further comprises at least one metallic pigment.

12. A material according to claim 1 wherein the mean particle size of the inorganic filler is about $10\mu$ or less.

* * * * *